United States Patent
Kim

(10) Patent No.: US 8,192,855 B2
(45) Date of Patent: Jun. 5, 2012

(54) PROTECTIVE CIRCUIT MODULE AND SECONDARY BATTERY HAVING THE SAME

(75) Inventor: Bongyoung Kim, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 497 days.

(21) Appl. No.: 12/382,938

(22) Filed: Mar. 26, 2009

(65) Prior Publication Data

US 2009/0305118 A1   Dec. 10, 2009

(30) Foreign Application Priority Data

Jun. 9, 2008 (KR) .................... 10-2008-0053802

(51) Int. Cl.
*H01M 10/48* (2006.01)
(52) U.S. Cl. ............... 429/7; 174/261; 429/61; 429/62; 429/93

(58) Field of Classification Search ........................ None
See application file for complete search history.

(56) References Cited

U.S. PATENT DOCUMENTS

| 7,811,686 | B2* | 10/2010 | Seo et al. ........................ 429/7 |
| 2006/0044728 | A1* | 3/2006 | Kim et al. ..................... 361/103 |
| 2006/0093896 | A1* | 5/2006 | Hong et al. ..................... 429/61 |
| 2008/0096101 | A1* | 4/2008 | Kwag et al. ................... 429/121 |
| 2008/0118820 | A1* | 5/2008 | Jang et al. ...................... 429/62 |
| 2008/0171235 | A1* | 7/2008 | Seo et al. ........................ 429/7 |
| 2008/0226974 | A1* | 9/2008 | Jang et al. .................... 429/121 |
| 2010/0159291 | A1* | 6/2010 | Kim .................................. 429/7 |
| 2011/0151730 | A1* | 6/2011 | Kim et al. ..................... 439/884 |
| 2011/0159323 | A1* | 6/2011 | Kim .................................. 429/7 |

FOREIGN PATENT DOCUMENTS

| JP | 2002-289160 | 10/2002 |
| JP | 2005268029 | 9/2005 |
| JP | 2007184241 | 7/2007 |
| KR | 1020050054800 A | 6/2005 |
| KR | 1020050087632 A | 8/2005 |
| KR | 1020080047982 A | 5/2008 |

* cited by examiner

*Primary Examiner* — George Suchfield
(74) *Attorney, Agent, or Firm* — Robert E. Bushnell, Esq.

(57) ABSTRACT

A secondary battery having a bare cell and a protective circuit module disposed over the bare cell and electrically connected to the bare cell via a first lead plate, in which the first lead plate includes a first plate, a second plate connected to the first plate, and a third plate arranged opposite to the first plate and connected to the second plate.

17 Claims, 6 Drawing Sheets

US 8,192,855 B2

PROTECTIVE CIRCUIT MODULE AND SECONDARY BATTERY HAVING THE SAME

CLAIM OF PRIORITY

This application makes reference to, incorporates the same herein, and claims all benefits accruing under 35 U.S.C. §119 from an application earlier filed in the Korean Intellectual Property Office on Jun. 9, 2008 and there duly assigned Serial No. 10-2008-0053802.

BACKGROUND OF THE INVENTION

1. Field of the Invention

The present disclosure relates to a protective circuit module and a secondary battery having the same.

2. Description of the Related Art

A lithium ion secondary battery is generally composed of a positive electrode plate, a negative electrode plate, an electrolyte and a separator, and is capable of repeated use after recharging the battery.

The lithium ion secondary battery is provided with a protective circuit module (PCM) for protecting the battery against excessive charging/discharging or overcurrent. The protective circuit module may be installed with a variety of conductive metal patterns including a protective circuit on a substrate.

The protective circuit module can be connected through a conductive tab (lead plate) to a bare cell including an electrode assembly. In order to secure a space for welding of the conductive tab to an electrode terminal of the bare cell, a portion of the substrate may be cut by a certain length or otherwise a hole may be formed on the substrate.

As a consequence, the substrate will lack a space for the installation of devices such as protective circuit and conductive metal pattern, due to truncation of the substrate or formation of the hole occupying a given portion of the substrate as described above. Further, even though individual devices may be installed on the substrate, the spacing (distance) between the devices becomes narrower, which may result in high susceptibility to a short circuit even under weak impact.

SUMMARY OF THE INVENTION

In accordance with an aspect of the present disclosure, the above and other objects can be accomplished by the provision of a secondary battery comprising: a bare cell; and a protective circuit module disposed over the bare cell and electrically connected to the bare cell via a first lead plate; wherein the first lead plate includes a first plate, a second plate connected to the first plate, and a third plate arranged opposite to the first plate and connected to the second plate.

The protective circuit module in accordance with an embodiment of the present disclosure comprises a substrate, a protective circuit part and a conductive metal pattern mounted on the substrate and a first lead plate disposed on the lower surface of the substrate, wherein the first lead plate includes a first plate, a second plate connected to the first plate and a third plate arranged opposite to the first plate and connected to the second plate, and a plurality of protrusions are formed on the lower surface of the first plate arranged opposite to the third plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Now, preferred embodiments of the present disclosure will be described in more detail with reference to accompanying drawings, such that those skilled in the art can easily practice the present disclosure. These and other objects, advantages and features of the present disclosure and methods of achieving the same will become apparent from the detailed embodiments given below which are made in conjunction with the following drawings. Like numbers refer to like elements throughout the specification and drawings.

Now, protective circuit modules in accordance with various embodiments of the present disclosure and secondary batteries comprising the same will be described in more detail with reference to the accompanying drawings. It should be understood that the term "secondary battery" as used herein encompasses a lithium ion secondary battery and an equivalent thereof.

Figure 1:
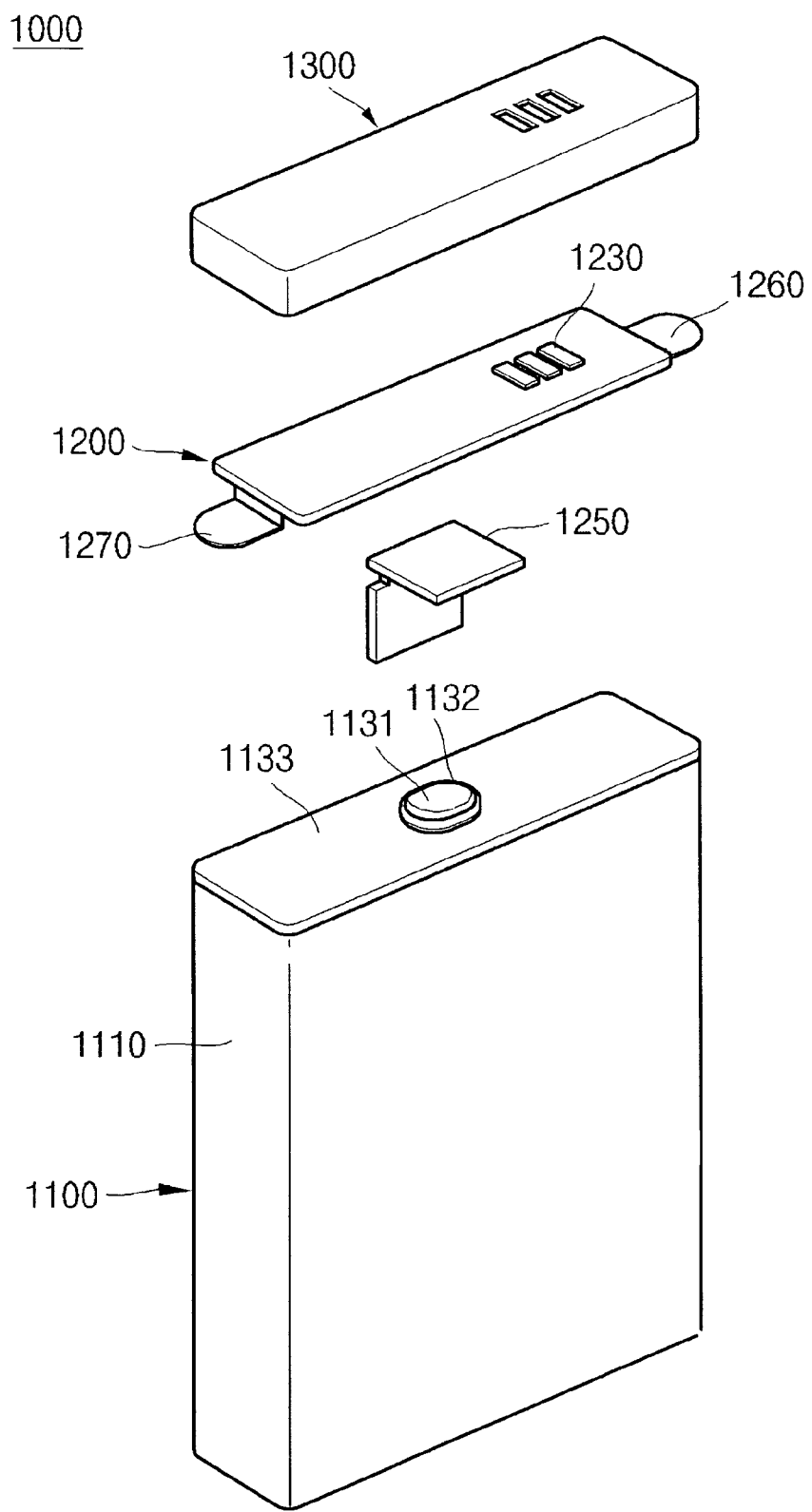
FIG. 1 is a perspective view of a secondary battery in accordance with an embodiment of the present disclosure.
Figure 2:
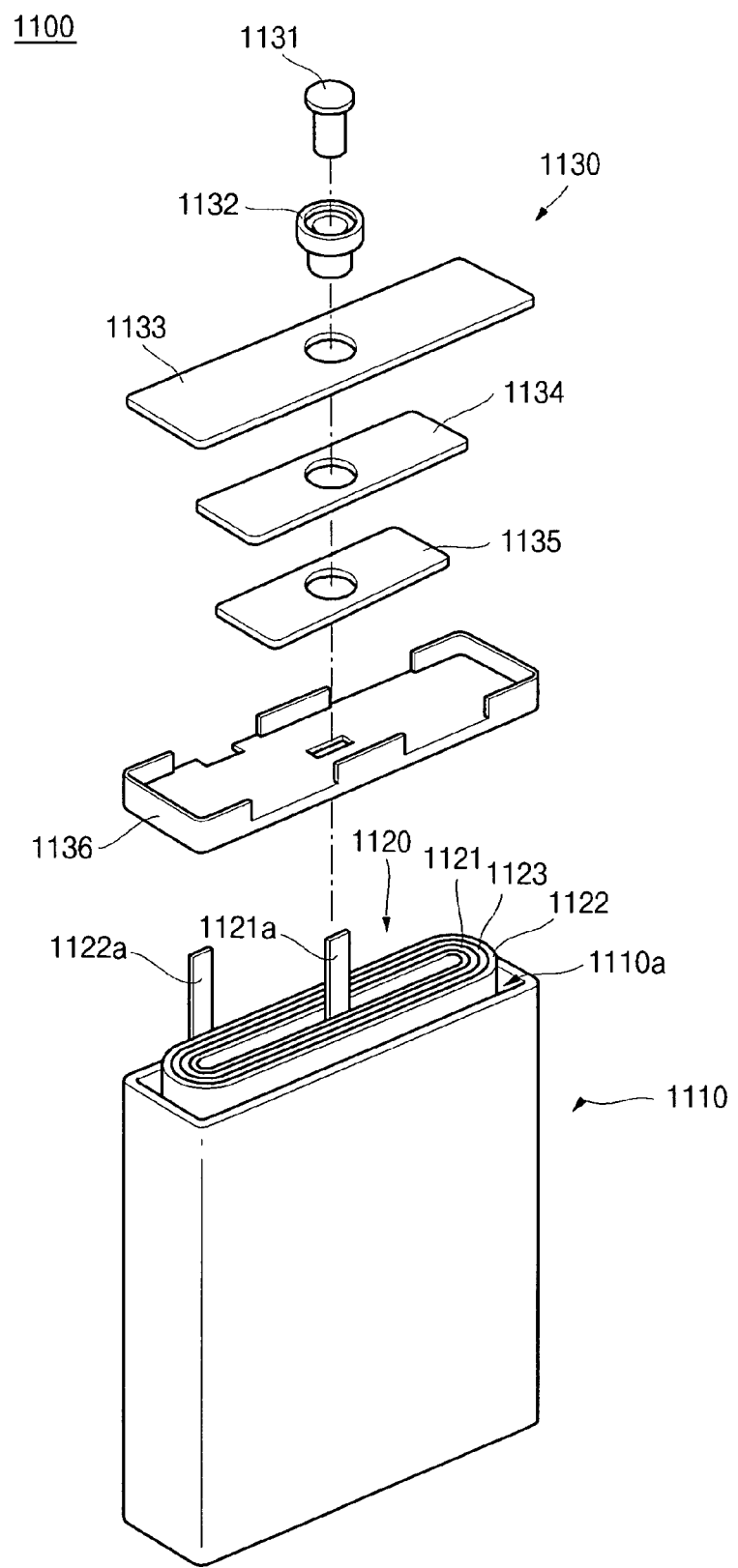
FIG. 2 is an exploded view of a bare cell in accordance with an embodiment of the present disclosure.
Figure 3:
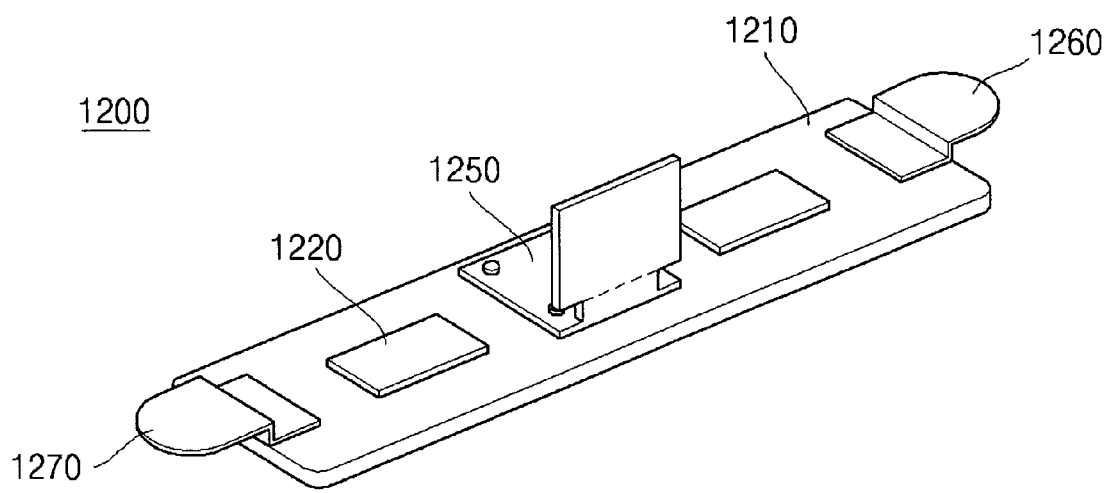
FIG. 3 is a perspective view of a protective circuit module in accordance with an embodiment of the present disclosure.
Figure 4:
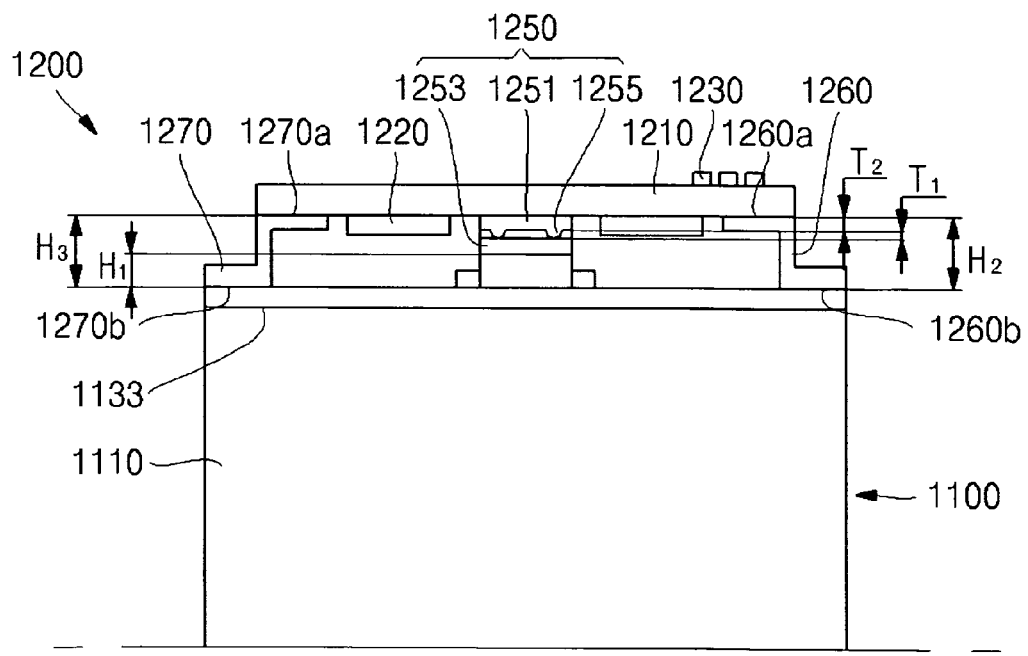
FIG. 4 is a front view showing a connection state between a protective circuit module and a bare cell in accordance with an embodiment of the present disclosure.

FIG. 1 is a perspective view of a secondary battery 1000 in accordance with an embodiment of the present disclosure, FIG. 2 is an exploded view of a bare cell 1100 in accordance with an embodiment of the present disclosure, and FIG. 3 is a perspective view of a protective circuit module 1200 in accordance with an embodiment of the present disclosure. FIG. 4 is a front view showing a connection state between a protective circuit module and a bare cell in accordance with an embodiment of the present disclosure.

Referring to FIG. 1 through FIG. 4, the secondary battery 1000 in accordance with an embodiment of the present disclosure may comprise a bare cell 1100, a protective circuit module 1200 disposed over the bare cell 1100 and a cover case 1300 disposed over the protective circuit module 1200. The protective circuit module 1200 can be electrically connected to an electrode terminal 1131 protruding from the bare cell 1100 through a first lead plate 1250 which will be illustrated hereinafter.

The bare cell 1100 can be fabricated by combining a can 1110, an electrode assembly 1120 and a cap assembly 1130. The electrode assembly 1120 is housed through an open upper part 1110a formed on one side of the can 1110, and the open upper part 1110a can be hermetically sealed by the cap assembly 1130. The bare cell 1100 has positive and negative electrodes which are electrically of opposite polarity, and may be a minimum unit of the secondary battery 1000 which is capable of performing a charging/discharging process.

The can 1110 may be of an open-topped generally rectangular shape having the open upper part 1110a. The can 1110 may be formed of a light-weight metal such as aluminum (Al), and may also serve as a terminal. The can 1110 can accommodate the electrode assembly 1120 and an electrolyte through the open upper part 1110a.

The electrode assembly 1120 may include a first electrode plate 1121, a second electrode plate 1122 and a separator 1123. Further, the electrode assembly 1120 is fabricated by stacking the first electrode plate 1121, the second electrode plate 1122 and the separator 1123 disposed therebetween and winding the resulting stacked structure into a jelly roll shape.

A first electrode tab 1121a and a second electrode tab 1122b are respectively attached to one side of the first electrode plate 1121 and the second electrode plate 1122 and then protrude toward the open upper part 1110a of the can 1110.

Upon charging of the electrode assembly 1120, lithium ions migrate into the first electrode plate 1121 from the second electrode plate 1122 (intercalation). In contrast, upon discharging, lithium ions migrate into the second electrode plate 1122 from the first electrode plate 1121 (deintercalation). In this manner, a voltage can be applied to external equipment via such a repeated intercalation/deintercalation process of lithium ions from the first electrode plate 1121 to the second electrode plate 1122 or vice versa.

Generally in the secondary battery 1000, the can 1110 serving as a terminal may be a positive electrode. If the first electrode plate is a negative electrode, the outermost electrode plate of a jelly-roll electrode assembly 1120 may be the second electrode plate 1122 which corresponds to the positive electrode. If the first electrode plate is a positive electrode, the outermost electrode plate of a jelly-roll electrode assembly 1120 may be a first electrode plate which corresponds to the positive electrode.

Hereinafter, an embodiment will be illustrated wherein the first electrode plate 1121 is a negative electrode and the second electrode plate 1122 is a positive electrode.

The cap assembly 1130 may include an electrode terminal 1131, a gasket 1132, a cap plate 1133, an insulating plate 1134 and a terminal plate 1135. The cap assembly 1130 in conjunction with a separate insulating case 1136 is combined into the electrode assembly 1120 at the open upper part 1110a of the can 1110, thus resulting in hermetic sealing of the can 1110.

The electrode terminal 1131 is inserted through the gasket 1132, the cap plate 1133, the insulating plate 1134 and a terminal through-hole of the terminal plate 1135 and then electrically connected to the first electrode tab 1121a of the electrode assembly 1120. The second electrode tab 1122a can be electrically connected to either side of the cap plate 1133 arranged opposite to the second electrode tab 1122a. The electrode terminal 1131 may be a negative electrode terminal.

The protective circuit module 1200 may include a substrate 1210, a protective circuit part 1220, a charge/discharge terminal 1230, a first lead plate 1250, a second lead plate 1260 and a dummy plate 1270. Further, the protective circuit module 1200 may include a conductive metal pattern (not shown). The protective circuit module 1200 protects the fabricated battery against overcharging and overcurrent and prevents performance deterioration of the battery due to overdischarging. It should be understood that the first lead plate 1250, the second lead plate 1260 and the dummy plate 1270 may also be incorporated into the protective circuit module 1200, even though they are not usually components necessary for construction of the protective circuit module 1200.

The conductive metal pattern and the protective circuit part 1220 are installed on the substrate 1210 which may be then fabricated in the form of a multi-stacked structure consisting of a plurality of the substrates 1210. The substrate 1210 may be formed of an epoxy or bakelite material.

In the protective circuit part 1220, passive and active elements including a protective circuit can be electrically connected to the conductive metal pattern. The protective circuit can protect the battery by checking of information such as charging/discharging state, current, voltage, and temperature of the battery.

The charge/discharge terminal 1230 can provide an electrical path for communication with external equipment, through electrical connection with the protective circuit part 1220 and the conductive metal pattern.

The test terminal 1240 is electrically connected to the protective circuit part 1220 and the conductive metal pattern and therefore can provide an electrical path to inspect whether the protective circuit part 1220 normally functions at the outside.

The first lead plate 1250 can be soldered to be connected to a lower surface of the protective circuit module 1200 arranged opposite to the electrode terminal 1131. The first lead plate 1250 can provide electrical connection between the protective circuit module 1200 and the electrode terminal 1131 protruding from the cap assembly 1130. Herein, the electrode terminal 1131 and the first lead plate 1250 may be a negative electrode terminal and a negative electrode lead plate, respectively. The first lead plate 1250 may be formed of at least one selected from nickel (Ni), aluminum (Al), a nickel alloy and an aluminum alloy. The structure and function of the first lead plate 1250 will be described in more detail with reference to FIGS. 5 through 9 which will follow.

The second lead plate 1260 may be soldered to be connected to one side of the protective circuit module 1200. The second lead plate 1260 can provide electrical connection between the protective circuit module 1200 and the cap assembly 1130, more specifically the cap plate 1133, for sealing the open upper part 1110a of the can 1110 in the bare cell 1100. The cap plate 1133 and the second lead plate 1260 may be a positive electrode terminal and a positive electrode lead plate, respectively. The second lead plate 1260 may be laser-welded to the cap plate 1133. The second lead plate 1260 may be formed of at least one selected from nickel (Ni), aluminum (Al), a nickel alloy and an aluminum alloy.

The dummy plate 1270 may be disposed on the other side of the protective circuit module 1200 which is arranged opposite to the second lead plate 1260 based on the first lead plate 1250. The dummy plate 1270 may be laser-welded to the cap plate 1133. The dummy plate 1270 is disposed opposite to the connection part between the first lead plate 1250 and the bare cell 1100, which may result in structural stability of the battery.

The cover case 1300 is disposed over the protective circuit module 1200, and serves to protect the protective circuit module 1200 via connection with the bare cell 1100, particularly the cap plate 1133.

Figure 5:
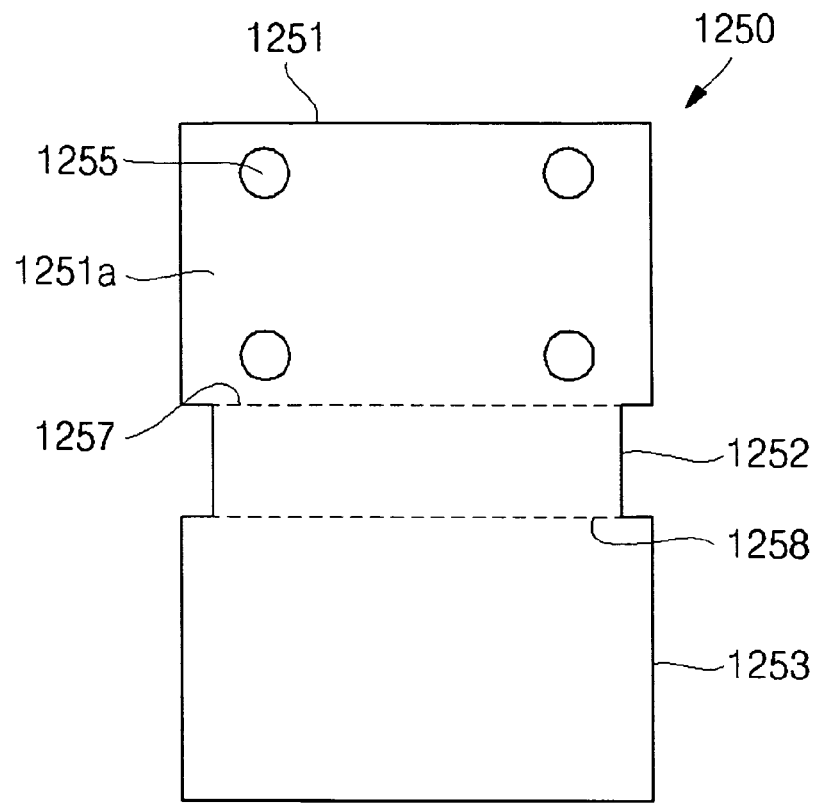
FIG. 5 is a development view of a first lead plate in accordance with an embodiment of the present disclosure.
Figure 6:
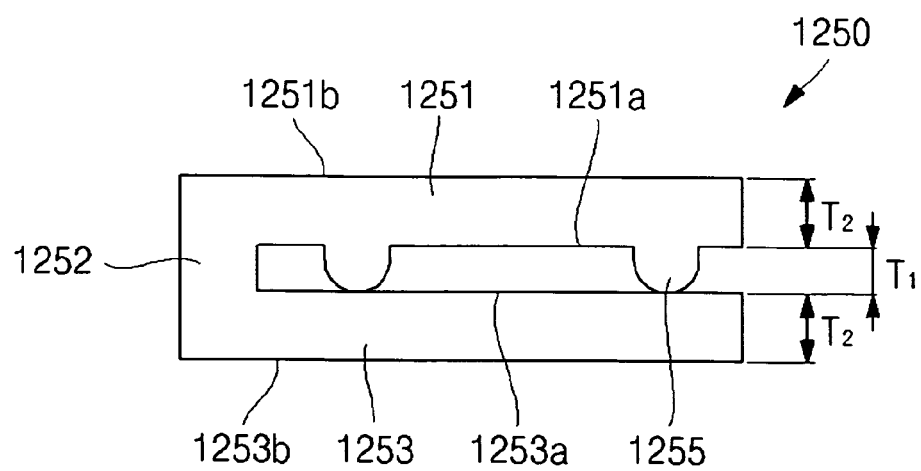
FIG. 6 is a side view of a first lead plate in accordance with an embodiment of the present disclosure.

FIG. 5 and FIG. 6 are respectively a development view and a side view of a first lead plate 1250 in accordance with an embodiment of the present disclosure.

Referring to FIGS. 5 and 6 in conjunction with FIG. 4, the first lead plate 1250 in accordance with one embodiment of the present disclosure may include a first plate 1251, a second plate 1252 and a third plate 1253. The first to third plates may be of a polygonal shape, preferably a square shape. Alternatively, a circular shape may also be possible.

More specifically, the first lead plate 1250 may include a first plate 1251, a second plate 1252 bent and connected to the first plate 1251, and a third plate 1253 arranged opposite to the first plate 1251 and bent from the second plate 1252. The first lead plate 1250 having the aforesaid structure may have a "⊏" shape.

A first connection part 1257 between the first plate 1251 and the second plate 1252 and a second connection part 1258 between the second plate 1252 and the third plate 1253 can be bent well due to high ductility.

One surface 1251*a* of the first plate 1251 faced opposite to the third plate 1253 may be provided with a plurality of protrusions 1255.

A shape of the protrusion 1255 may be of a hemisphere where a curved surface is downward. When a plurality of protrusions 1255 are in contact with an upper surface of the third plate 1253, there is no particular limit to a shape of the protrusion 1255 as long as uniform contact can be made between the protrusion 1255 and the third plate 1253. In the preferred embodiment of the present disclosure, the protrusion 1255 may have a hemisphere shape or bar shape. Details of the bar shape will be illustrated hereinafter with reference to FIG. 9.

The protrusion 1255 may be cast integrally with the first lead plate 1250 or otherwise may be rolled by a press having depressed protrusions. An upper surface 1251*b* of the first plate 1251, which is opposite to the lower surface 1251*a* of the first plate 1251 where the protrusions 1255 are provided, may be flat.

The protrusions 1255 may be respectively provided at the angular points on the lower surface 1251*a* of the first plate 1251. Further, the protrusion 1255 may be further disposed at the center on the lower surface 1251*a* of the first plate 1251. By arrangement of the protrusions 1255 at the angular points and the center of the first plate 1251 at regular intervals, it is possible to achieve stability of the first lead plate 1250 and good contact between the first plate 1251 and the third plate 1253.

The bare cell 1100 can be electrically connected to the protective circuit module 1200 through the first lead plate 1250 and the second lead plate 1260.

A thickness (T1) of the protrusion 1255 may be equal to a distance between the first plate 1251 and the third plate 1253, when the first plate 1251 and the third plate 1253 are parallel to each other. Therefore, when the electrode terminal 1131 and the protective circuit module 1200 are combined for electrical connection therebetween, the first lead plate 1250 supports the first plate 1251 and the third plate 1253 to be parallel to each other, resulting in stability of the resulting structure.

In the secondary battery 1000, the sum of a thickness (T1+2T2) of the first lead plate 1250 and a height (H1) of the electrode terminal 1131 protruding from the bare cell 1100 may be equal to a height (H2) of the second lead plate 1260. The height (H2) of the second lead plate 1260 represents a distance between an upper surface 1260*a* of the second lead plate 1260 connected to the protective circuit module 1200 and a lower surface 1260*b* of the second lead plate 1260 connected to the bare cell 1100.

In the secondary battery 1000, the sum of a thickness (T1+2T2) of the first lead plate 1250 and a height (H1) of the electrode terminal 1131 protruding from the bare cell 1100 may be equal to a height (H3) of the dummy plate 1270. The height (H3) of the dummy plate 1270 represents a distance between an upper surface 1270*a* of the dummy plate 1270 connected to the protective circuit module 1200 and a lower surface 1270*b* of the dummy plate 1270 connected to the bare cell 1100.

In conclusion, the sum of a thickness (T1+2T2) of the first lead plate 1250 and a height (H1) of an electrode terminal 1131 protruding from the bare cell 1100, a height (H2) of the second lead plate 1260, and a height (H3) of the dummy plate 1270 may all have the same value. As a consequence, the bare cell 1100 and the protective circuit module 1200 can be configured to have a uniform and stable structure.

More specifically, a thickness (T2) of the first plate 1251 and the third plate 1253 may be 0.15 mm and a thickness (T1) of the protrusion 1255 may be 0.3 mm. Further, a thickness (T1, T2) of the first plate 1251, the third plate 1253 and the protrusion 1255 may all have the same value of 0.2 mm.

If a height (H1) of the electrode terminal 1131 protruding from the bare cell 1100 is 0.83 mm, a height (H2, H3) of the second lead plate 1260 and the dummy plate 1270 may be 1.43 mm.

The protective circuit module 1200 and the bare cell 1100, more specifically the protective circuit module 1200 and the cap plate 1133 may be first connected to the second lead plate 1260 and the dummy plate 1270. In this connection, the cap assembly 1130 may be laser-welded to the second lead plate 1260 and the dummy plate 1270. In the secondary battery 1000 connected and fabricated as above, the sum of a thickness (T1+2T2) of the first lead plate 1250 and a height (H1) of the electrode terminal 1131 protruding from the bare cell 1100, a height of the second lead plate 1260, and a height of the dummy plate 1270 may be equal to one another. As a result, the electrode terminal 1131, the third plate 1253, the protrusion 1255, the first plate 1251 and the protective circuit module 1200 are all in contact to thereby result in electrical connection therebetween. Therefore, even though there is no welding between the third plate 1253 and the electrode terminal 1131, electrical contact is made between the first lead plate 1250 and the electrode terminal 1131, which results in flow of electric current into the protective circuit module. The secondary battery 1000 is capable of reducing an additional manufacturing process and time necessary for welding of components and consequently decreasing production costs of the secondary battery 1000.

Further, since the first lead plate 1250 can be bent at the connection parts 1257,1258 where the plates meet each other, the electrode terminal 1131 and the third plate 1253 of the first lead plate 1250 may be first welded to provide electrical connection therebetween. Thereafter, the protective circuit module 1200 and the cap plate 1133 may be connected to the second lead plate 1260 and the dummy plate 1270. In other words, the third plate 1253 and the electrode terminal 1131 are electrically connected using any conventional welding techniques such as laser welding, spot welding or resistance welding, and the protective circuit module 1200 and the cap plate 1133 are then connected to the second lead plate 1260 and the dummy plate 1270.

The secondary battery 1000 configured and fabricated as above may not need formation of a hole for welding of the first lead plate 1250 to the electrode terminal 1131, in a certain portion of the protective circuit module 1200 corresponding to the first lead plate 1250.

Accordingly, the protective circuit module 1200 can secure more spaces capable of installing the protective circuit part 1220 or the conductive metal pattern which will be formed on the substrate 1210. That is, provision of the substrate 1210 in the form of a multi-stacked structure is not necessary to secure a space for installation of the protective circuit part 1220 or the conductive metal pattern. As a consequence, it is possible to achieve monolayer structuring of the protective circuit module 1200, which thereby results in miniaturization and weight reduction of the secondary battery 1000, and consequent reduction of production costs.

Figure 7:
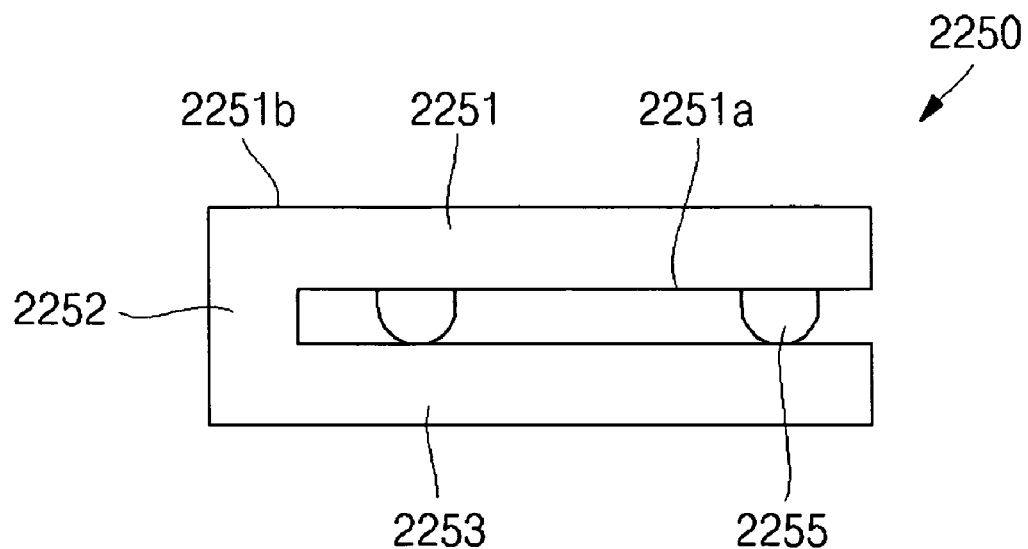
FIG. 7 and FIG. 8 are side views of first lead plates in accordance with other embodiments of the present disclosure.
Figure 8:
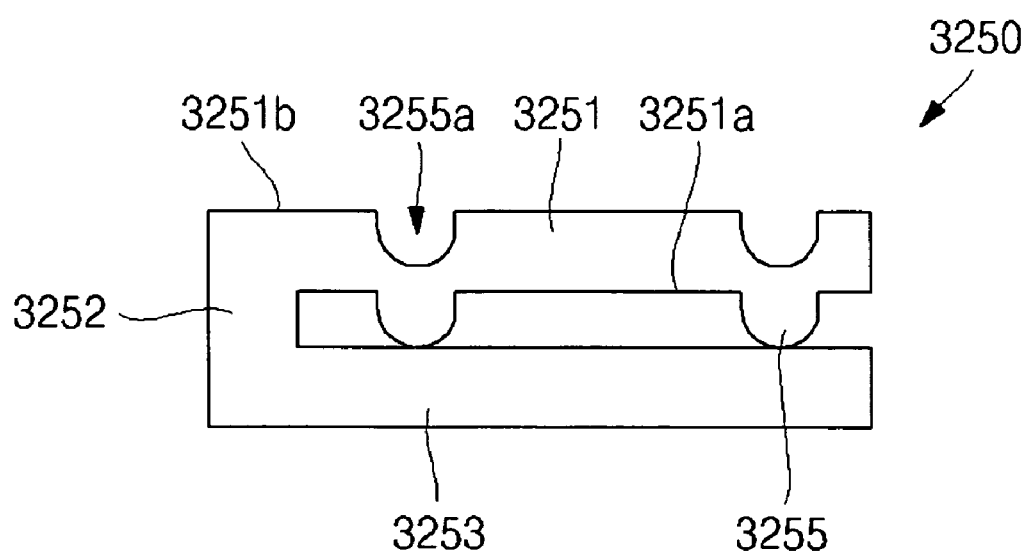

FIG. 7 and FIG. 8 are side views of first lead plates 2250, 3250 in accordance with other embodiments of the present disclosure.

Referring to FIG. 7 and FIG. 8, in the secondary battery in accordance with other embodiments of the present disclosure, protrusions 2255 may be separately fabricated and attached to a lower surface 2251*a* of the first plate 2251. Even though a material forming the protrusion may be the same as that of each plate, there is no particular limit to the material used for formation of the protrusion, as long as it provides stable contact with the first plate 2251 and the third plate 2253.

In the first lead plate 3250, depressions 3255*a* may be provided on the upper surface 3251*b* of the first plate 3251 arranged opposite to the lower surface 3251*a* of the first plate 3251 with formation of the protrusions 3255. A shape of the depression 3255*a* may be identical to that of the protrusion 3255.

The first plate 3251 may be prepared by press indentation using a press having embossed protrusions. Consequently, protrusions 3255 having a hemisphere shape can be formed on the lower surface 3251*a* of the first plate 3251, whereas hemisphere-shaped depressions can be formed on an upper surface 3251*b* of the first plate 3251 opposite to the protrusions 3255.

The configuration of the secondary battery except for formation of the depressions 3255*a* on the upper surface 3251*b* of the first plate 3251 is the same as that in FIGS. 1 to 6, so details thereof will be omitted herein.

Figure 9:
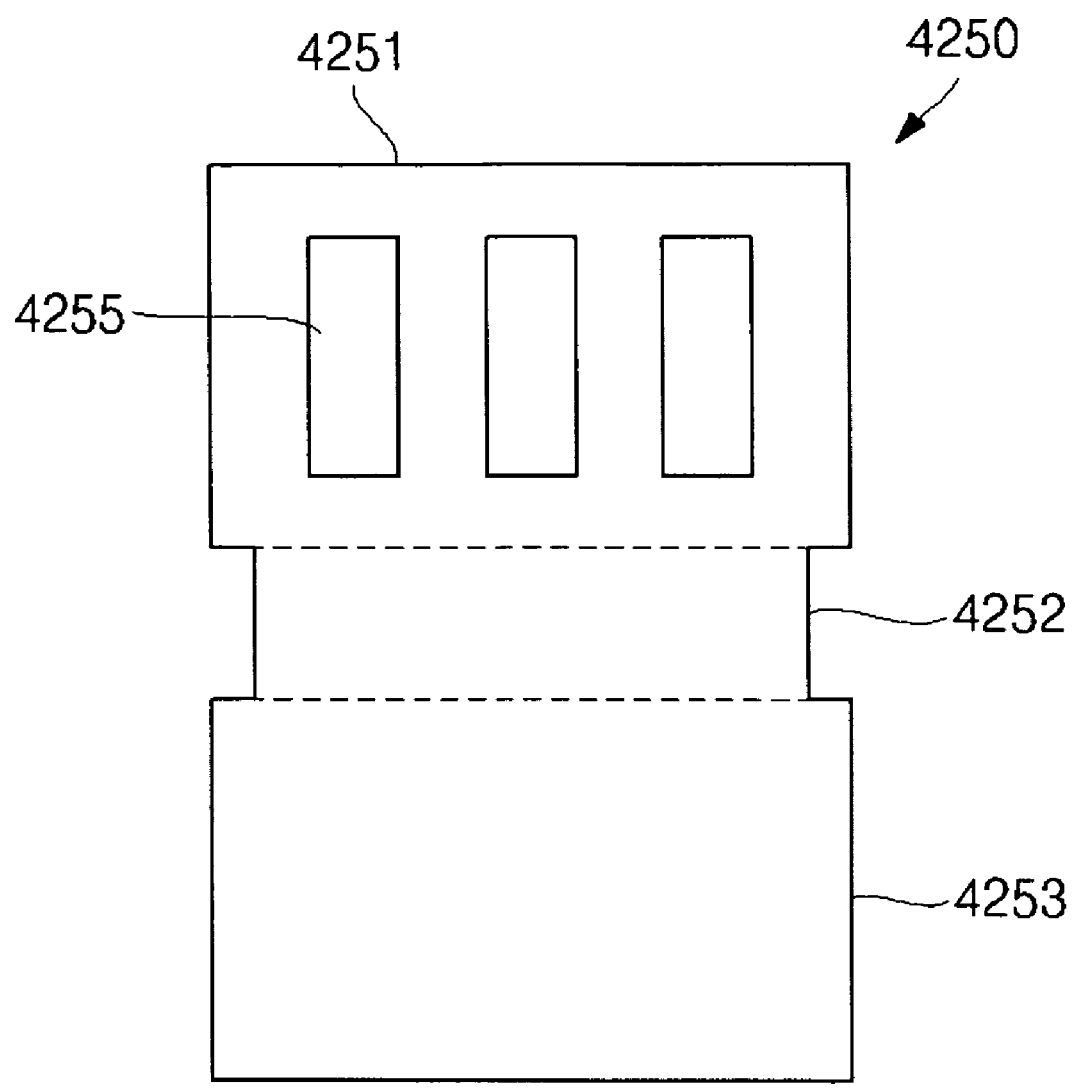
FIG. 9 is a development view of a first lead plate in accordance with a further embodiment of the present disclosure.

FIG. 9 is a development view of a first lead plate 4250 in accordance with a further embodiment of the present disclosure.

Referring to FIG. 9, a protrusion 4255 in accordance with a further embodiment of the present disclosure may have a bar shape.

One surface 4251*a* of a first plate 4251 is provided with bar-shaped protrusions 4255 which are arranged vertically to a second plate 4252. Although not shown in FIG. 9, bar-shaped protrusions 4255 may be provided parallel to the second plate 4252. Further, even though 3 protrusions are shown in FIG. 9, smaller or larger numbers of the protrusions may be formed. It is preferred to provide two or more protrusions for stable contact with the third plate. Even though a long side of the protrusion 4255 was shown to be shorter than a short side of the first plate 4251 on the plane in FIG. 9, a long side of the protrusion 4255 may have the same length as a short side of the first plate 4251.

Provision of the protrusion 4255 in the form of a bar can increase stability of the first lead plate 4250 and further improve contactability between the first plate 4251 and the third plate 4253.

The configuration of the secondary battery except for formation of the bar-shaped protrusions 4255 is the same as that in FIGS. 1 to 8, so details thereof will be omitted herein.

As apparent from the above description, protective circuit modules in accordance with a variety of embodiments of the present disclosure and secondary batteries comprising the same enable enlargement of a device installation space on a protective circuit module, due to no formation of a hole at the position where a lead plate is connected in the protective circuit module.

As a consequence, the present disclosure enables monolayer structuring of the protective circuit module, which results in miniaturization and weight reduction of a secondary battery and consequent reduction of production costs.

Further, the present disclosure enables removal of a process for welding of the lead plate to an electrode terminal, which in turn results in a simplified production process and consequent reduction of production costs.

Although the preferred embodiments of the present disclosure have been described with reference to the attached drawings, those skilled in the art will appreciate that various modifications, additions and substitutions are possible, without departing from the scope and spirit of the disclosure as disclosed in the accompanying claims. It should be understood that the embodiments and the accompanying drawings have been disclosed for illustrative purposes only and the present disclosure is limited only by the following claims. Furthermore, it is to be understood that various modifications, additions and substitutions that can be derived from the equivalent concepts of the accompanying claims and drawings fall within the scope of the present disclosure.

What is claimed is:

1. A secondary battery, comprising:
   a bare cell; and
   a protective circuit module disposed over the bare cell and electrically connected to the bare cell via a first lead plate the first lead plate, comprising:
   a first plate;
   a second plate connected to the first plate; and
   a third plate arranged opposite to the first plate and connected to the second plate,
   wherein a plurality of protrusions are provided on a lower surface of the first plate faced opposite to the third plate.

2. The battery according to claim 1, wherein the bare cell includes a can, a electrode assembly, and a cap assembly having an electrode terminal,
   wherein the electrode assembly disposed over an upper surface of the bare cell and the third plate is connected to the electrode terminal.

3. The battery according to claim 2, wherein the third plate is in contact with the electrode terminal.

4. The battery according to claim 3, wherein the third plate is welded to the electrode terminal.

5. The battery according to claim 2, wherein one side of the protective circuit module is provided with a second lead plate electrically connected to the cap assembly, and a dummy plate is further provided on the other side of the protective circuit module based on the first lead plate.

6. The battery according to claim 5, wherein the sum of a thickness of the first lead plate and a height of an electrode terminal protruding from the bare cell is equal to a height of the second lead plate.

7. The battery according to claim 1, wherein the protrusion has a hemisphere shape.

8. The battery according to claim 1, wherein the protrusion has a bar shape.

9. The battery according to claim 1, wherein the protrusion is formed by press indentation of an upper surface of the first plate and then protrudes downward to a lower surface of the first plate.

10. The battery according to claim 1, wherein the protrusion is formed integrally with the first plate and an upper surface of the first plate is flat.

11. The battery according to claim 1, wherein the protrusion is attached to a lower surface of the first lead plate.

12. The battery according to claim 1, wherein the first plate is of a square shape and the protrusions are respectively disposed at the angular points on the lower surface of the first plate.

13. The battery according to claim 12, wherein the protrusion is further disposed at the center on the lower surface of the first plate.

14. The battery according to claim 1, wherein the protrusion is in contact with the third plate.

15. The battery according to claim 1, wherein the first lead plate and the protrusion are formed of at least one selected from nickel (Ni), aluminum (Al), a nickel alloy and an aluminum alloy.

16. A secondary battery, comprised of:
a bare cell;
a protective circuit module, comprising:
a substrate; and
a protective circuit part and a conductive metal pattern mounted on the substrate; and
a first lead plate disposed on the lower surface of the substrate and electrically connecting the bare cell to the protective circuit module, the first lead plate comprising:
a first plate;
a second plate connected to the first plate;
a third plate arranged opposite to the first plate and connected to the second plate; and
a plurality of protrusions formed on the lower surface of the first plate arranged opposite to the third plate.

17. A secondary battery, comprised of:
a bare cell;
a protective circuit module, comprising:
a substrate;
a protective circuit part and a conductive metal pattern mounted on the substrate; and
a first lead plate disposed on the lower surface of the substrate and electrically connecting the bare cell to the protective circuit module, the first lead plate comprising:
a first plate;
a second plate connected to the first plate; and
a third plate arranged opposite to the first plate and connected to the second plate,
a plurality of protrusions having a hemispherical shape formed on a lower surface of the first plate arranged opposite to the third plate and
a plurality of depressions having a shape identical to that of the hemispherical shape of the plurality of protrusions and formed on an upper surface of the first plate opposite to said lower surface of the first plate.

* * * * *